US009897710B2

(12) United States Patent
Kragh et al.

(10) Patent No.: US 9,897,710 B2
(45) Date of Patent: Feb. 20, 2018

(54) BOREHOLE SEISMIC ACQUISITION TOOLS, SYSTEMS AND METHODS

(71) Applicant: Schlumberger Technology Corporation, Sugar Land, TX (US)

(72) Inventors: Julian Edward Kragh, Great Bardfield (GB); Philip A. F. Christie, Cambridgeshire (GB); Emmanuel Coste, Oslo (NO); Nicolas Goujon, Oslo (NO); Clement Kostov, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 376 days.

(21) Appl. No.: 13/905,131

(22) Filed: May 30, 2013

(65) Prior Publication Data
US 2013/0343158 A1 Dec. 26, 2013

Related U.S. Application Data

(60) Provisional application No. 61/664,680, filed on Jun. 26, 2012.

(51) Int. Cl.
*G01V 1/30* (2006.01)
*G01V 1/40* (2006.01)
*G01V 1/28* (2006.01)
*G01V 1/42* (2006.01)

(52) U.S. Cl.
CPC .............. *G01V 1/30* (2013.01); *G01V 1/28* (2013.01); *G01V 1/40* (2013.01); *G01V 1/42* (2013.01)

(58) Field of Classification Search
CPC ..... G01V 1/30; G01V 1/42; G01V 1/28; G01V 1/40
USPC ........................................................... 367/25
See application file for complete search history.

(56) References Cited

U.S. PATENT DOCUMENTS 5,253,219 A * 10/1993 Houston et al. ................ 367/79
6,723,404 B2 * 4/2004 Johnson ........................ 428/35.7
7,823,689 B2 * 11/2010 Aronstam et al. ............ 181/106
8,174,403 B2 * 5/2012 Kamata et al. ............ 340/853.2

(Continued)

OTHER PUBLICATIONS

Wong et al., "Cross-Hole Seismic Scanning and Tomography," The Leading Edge of Exploration, Jan. 1987, 36-41.
(Continued)

*Primary Examiner* — Luke Ratcliffe
*Assistant Examiner* — Amie M N'Dure
(74) *Attorney, Agent, or Firm* — Trevor G. Grove

(57) ABSTRACT

A tool is described for seismic data collection which may have sensors mounted along its entire length to sample both geophysical signal and noise including at least one of acoustic noise, system noise, and noise resulting from the interaction between the two. Systems and methods for acquiring borehole seismic data are also described. In contrast to conventional systems which attempt to avoid introducing noise into the collected data stream, the present systems include a sufficient type, number, and spacing of sensors to intentionally sample at least one source of noise. The methods include operating a borehole seismic acquisition system to sample both a target signal and at least one source of noise and using a processor with machine-readable instructions for separating the noise from the signal.

11 Claims, 3 Drawing Sheets

(56) References Cited

U.S. PATENT DOCUMENTS

| | | | |
|---|---|---|---|
| 8,976,625 B2* | 3/2015 | Blias | 367/57 |
| 2004/0105341 A1* | 6/2004 | Chamberlain et al. | 367/21 |
| 2004/0112594 A1* | 6/2004 | Aronstam et al. | 166/249 |
| 2004/0156267 A1* | 8/2004 | O'Brien et al. | 367/149 |
| 2004/0223410 A1* | 11/2004 | West et al. | 367/25 |
| 2005/0047275 A1* | 3/2005 | Chamberlain et al. | 367/56 |
| 2006/0175125 A1* | 8/2006 | West et al. | 181/122 |
| 2008/0316860 A1* | 12/2008 | Muyzert et al. | 367/25 |
| 2009/0092003 A1* | 4/2009 | Goujon et al. | 367/16 |
| 2009/0140879 A1* | 6/2009 | Kamata et al. | 340/853.2 |
| 2009/0154289 A1* | 6/2009 | Johansen | 367/21 |
| 2009/0168599 A1* | 7/2009 | Suarez et al. | 367/35 |
| 2012/0106294 A1* | 5/2012 | Blias | 367/38 |

OTHER PUBLICATIONS

International Search Report for the equivalent PCT patent application No. PCT/US2013/046472 dated Sep. 26, 2013.
Marzetta et al., "A Hydrophone Vertical Seismic Profiling Experiment," Geophysics, Nov. 1988, vol. 53, No. 11, pp. 1437-1444.
Kragh et al., "Anisotropic Traveltime Tomography in a Hard-Rock Environment," First Break, vol. 14, No. 10, Oct. 1996, pp. 391-397.

\* cited by examiner

BOREHOLE SEISMIC ACQUISITION TOOLS, SYSTEMS AND METHODS

FIELD

The present disclosure relates to the study of underground formations and structures, for example as it relates to oil and gas exploration. The present disclosure relates more specifically to seismic surveying of subterranean geological formations.

BACKGROUND

Borehole seismic survey systems may involve sources located at the surface and receivers placed in the well. Other configurations are possible, for example the drill bit can function as the seismic source and receivers can be placed at the surface. No matter the configuration, noise can be recorded in acquisition, which may impact the accuracy of seismic analysis.

Borehole seismic acquisition systems can be configured to avoid noise, for example by spacing sensors according to signal sampling requirements and by isolating sensors using mechanical design principles. For example, in borehole seismic acquisition, the downhole tool may include an array (or multi-level in depth) of individual acquisition nodes or shuttles housing at least one seismic sensor and associated acquisition electronics. At each depth level, these shuttles can be designed to optimize their geophysical coupling response to the surrounding formation by mechanical, magnetic or hydraulic clamping devices. Coupling to the formation may ensure the sensor(s) in the shuttle respond to the particle motion of the seismic wave passing through the formations penetrated by the borehole. Coupling can also serve to minimize the recording of geophysical noise, e.g. the tube wave energy in a borehole. Because such devices may be intended to record the seismic response in the surrounding formation (the geophysical signal) the depth interval between measuring points or shuttles can be defined by the seismic signal processing requirements. This depth interval may be on the order of ten meters. For example, the Schlumberger Versatile Seismic Imager (VSI)[1] tool uses a 15 m separation with up to 40 separate shuttles, and the Paulsson Inc. 100-level array tool (Paulsson) also has a standard shuttle separation of 15 m. Both these tools are based on individual clamped units containing three-component geophones/accelerometers.

[1] Versatile Seismic Imager (VSI) is a trademark of Schlumberger.

Clamping devices use power and are relatively heavy and so this may limit the number of measuring points and therefore the total length of the tool. In order to cover a larger depth aperture in the borehole, or to sample the depth interval more finely, the complete borehole tool should be moved to a different depth and the seismic experiment repeated, a procedure which relies on the repeatability of the seismic source signature. Clamping devices can also become stuck or jammed, increasing the risk of not being able to retrieve the tool from the borehole.

Alternative systems have been proposed and used in the past. U.S. Pat. Pub. No. 2008/0316860, which is herein incorporated by reference in its entirety, describes a borehole acquisition system (a single length of 'streamer') that contains hydrophones only. However, the system uses densely sampled groups of hydrophones to estimate gradients of the wavefield directly from the hydrophone measurements. The distance (depth interval) between these groups of hydrophones is governed by the signal sampling requirements.

Borehole streamers containing only hydrophones have been used to acquire both vertical seismic profile (VSP) and cross-well seismic surveys (see for example, Wong et al., TLE, January 1987, 36-41; Marzetta et al., A Hydrophone Vertical Seismic Profiling Experiment, Geophysics, 1988, 53 (11), 1437-1444; Kragh et al., Anisotropic Traveltime Tomography in a Hard-Rock Environment, First Break, 1995, 14 (10), 391-397). Although these systems were designed for borehole environments they appear to have limited overall length (32 channels, 12 channels and 16 channels, respectively). The hydrophone spacing in these tools is a few meters, with the exception of Marzetta et al. (1988), which uses a 1.5 m hydrophone spacing to sample the tube wave noise adequately for later attenuation in processing, and 8 separate downhole positions to cover the aperture. Marzetta et al. (1988) notes that the modest degree of tube-wave attenuation achieved in their experiment was due, in part, to poor tube-wave coherency caused by shot-to-shot non-repeatability. These systems appear to not contain vector wavefield sensors.

SUMMARY

In contrast to conventional seismic acquisition devices, systems and methods, which are configured to avoid introducing noise into the collected data, the present disclosure relates to devices, systems and methods for intentionally collecting data relating to both the target signal and at least one source of noise. Accordingly, the present disclosure provides a borehole seismic tool for sampling a target signal as well as at least one source of noise. The present disclosure also provides a system for acquiring and analyzing a seismic data stream including data relating to a target signal as well as data relating to at least one source of noise. The present disclosure also provides methods for acquiring and analyzing a seismic data stream including data relating to a target signal as well as data relating to at least one source of noise.

In some embodiments, the seismic acquisition tool includes a cable which may be the length of the borehole, for example up to several kilometers in length, and also includes sensors placed along (e.g. mounted within) the entire length of the cable. In some embodiments, the seismic acquisition tool does not include mechanical devices, such as clamps, for avoiding noise. In some embodiments, the seismic acquisition tool may be deployed in a solid-filled borehole, e.g. cemented in the borehole. In some embodiments, the sensors include at least one type of sensors, e.g. hydrophones, accelerometers, and rotational devices, and are chosen such that both geophysical signal and at least one source of noise (and including all sources) may be sampled. The sensors are arranged along the length of the cable in a manner that results in unaliased sampling of both signal and noise.

In some embodiments, the seismic acquisition system includes a tool for sampling geophysical signal and at least one source of noise and a processor including machine-readable instructions for removing the noise from the signal. The tool can be a cable up to several kilometers in length having at least one type of sensors spaced along the length of the cable such that both the signal and the noise are sampled without aliasing. In some embodiments, the cable includes at least one type of sensors spaced along the length of the cable such that all sources of noise are sampled.

In some embodiments, the method includes firing a seismic source, collecting data relating to a geophysical signal and at least one source of noise (and including all sources) using a seismic tool having a cable up to several kilometers in length and including at least one type of sensors along the length of the cable and at an appropriate spacing or sufficient aperture or both such that the signal and at least one source of noise may be sampled without aliasing. In some embodiments, the method includes using a seismic tool having a cable up to several kilometers in length and including at least one type of sensors along the length of the cable and at an appropriate spacing or sufficient aperture or both such that the signal and all of the sources of noise are sampled without aliasing. In some further embodiments, the method also includes processing the collected data to separate the noise from the signal.

The identified embodiments are exemplary only and are therefore non-limiting. The details of one or more non-limiting embodiments of the invention are set forth in the accompanying drawings and the descriptions below. Other embodiments of the invention should be apparent to those of ordinary skill in the art after consideration of the present disclosure.

DETAILED DESCRIPTION

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" and "having" (and similarly "comprises" and "includes" and "involves" and "has") are used interchangeably and mean the same thing. Specifically, each of the terms is defined consistent with the common United States patent law definition of "comprising" and is therefore interpreted to be an open term meaning "at least the following" and is also interpreted not to exclude additional features, limitations, aspects, etc.

The terms "about" or "substantially" are meant to account for variations due to experimental error, or alternatively to permit deviations from the measured quantity or descriptor that don't negatively impact the intended purpose. All measurements or numbers are implicitly understood to be modified by the word about, even if the measurement or number is not explicitly modified by the word about. Similarly, descriptive terms are implicitly understood to be modified by the word substantially, even if the term is not explicitly modified by the word substantially.

The terms "wellbore" and "borehole" are used interchangeably.

Figure 1A:
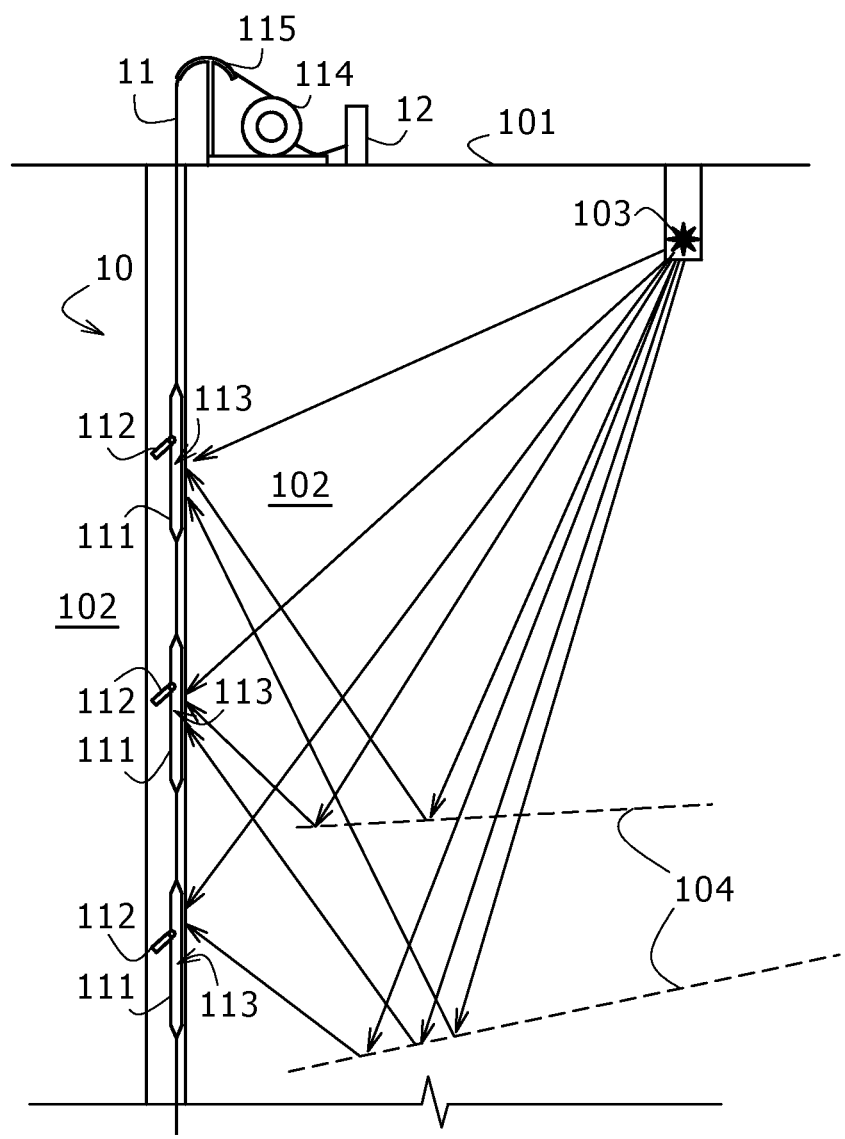
FIG. 1A is a schematic illustration of a prior art vertical seismic profiling operation.

A prior art vertical seismic acquisition in a borehole is illustrated in FIG. 1A. There is shown a borehole 10. Suspended from the surface 101 into the borehole 10 is a cable 11 carrying a plurality of VSP shuttles 111. System noise may be alleviated or avoided by pushing or wedging the shuttles 111 against the formation 102 or any casing surrounding the wellbore 10 using a clamping or locking mechanism 112.

The clamping or locking mechanism 112 can be based on the use of springs, telescopic rams or pivoting arms as shown. The shuttles 111 can carry transducer elements 113 to measure the velocity or acceleration in one of three independent directions. The clamping mechanism 112 ensures that the transducers 113 are coupled to the borehole wall. In a VSP operation, a decrease in the signal-to-noise ratio can be observed when the geophone loses contact with the wall of the borehole 10.

On the surface 101, a cable reel 114 and feed 115 supports the cable 11. Measurement signals or data are transmitted through the cable 11 to a base station 12 on the surface 101 for further processing. The cable 11 can be an armored cable as used for wireline operations with a plurality of wire strands running through its center.

In operation a source 103 as shown is activated generating seismic waves which travel through the formation 102. Where there are changes in formation impedance (as indicated by dashed lines 104), part of the seismic energy may be reflected and/or refracted. The transducers 113 register movements of the earth and the measurements are transmitted directly or after in-line digitization and/or signal processing to the surface base station 12 for storage, transmission and/or further processing. The subsequent data processing steps are known and well established in the field of hydrocarbon exploration and production.

Figure 1B:
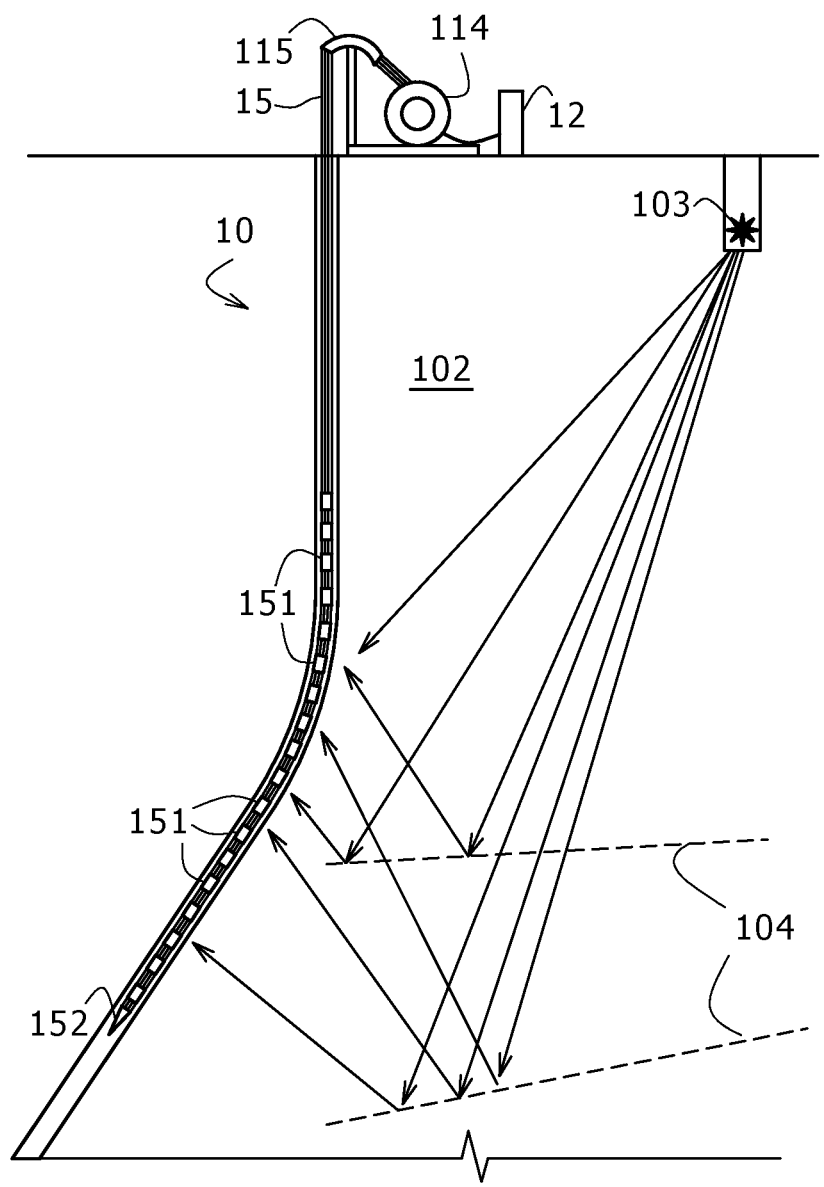
FIG. 1B is a schematic illustration of another prior art vertical seismic profiling operation.

FIG. 1B illustrates a seismic apparatus similar to that of FIG. 1A except the shuttle-carrying cable 11 of FIG. 1A is replaced by a cable 15 having a plurality of internal mounts 151 to each accommodate at least two hydrophones. Such an apparatus is described in U.S. Pat. Pub. No. 2008/0316860 ("the '860 publication"), which as previously stated is herein incorporated by reference in its entirety. The cable 15 (hereinafter "borehole seismic cable" or "streamer") has the appearance of a streamer as used in marine seismic acquisitions in that the skin or outer layer of the cable has substantially the same diameter at the locations of the sensors as in between the sensors. The '860 publication describes various configurations of the densely sampled groups of hydrophones to estimate gradients of the wavefield directly from the hydrophone measurements. The distance (depth interval) between these groups of hydrophones can be governed by the signal sampling requirements.

Figure 2:
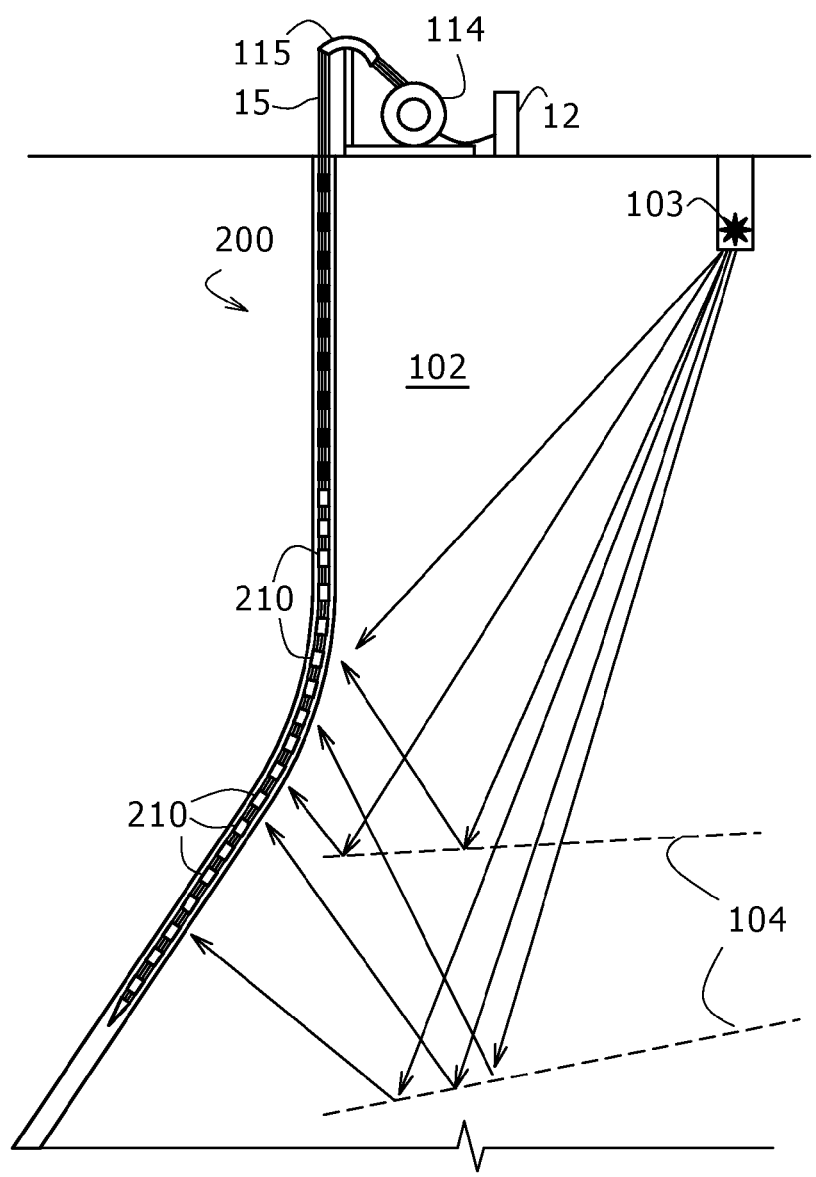
FIG. 2 is a schematic illustration of a vertical seismic profiling operation using tools, apparatus and methods described herein.

FIG. 2 illustrates a seismic apparatus similar to that of FIG. 1B, except one difference is that the cable 15 may include at least one type of sensors 210 (i.e. it is not limited to hydrophones). For example, the cable 15 can include at least one type of sensors chosen from hydrophones, geophones, accelerometers, gradient and rotational devices. These devices may be based on any suitable technology such as moving coil mechanical, MEMS, chemical, magnetohydrodynamic, or any other sensor technology that provides the pressure, motion, rotation or gradient information. The sensors can be incorporated into the cable 15 as described in the '860 publication, or by any other suitable method with the objective that the sensors (e.g. within the skin) can detect geophysical signal which is representative of the signals in the borehole and/or formation while minimizing sensitivity to self-noise of the cable.

In contrast to the devices illustrated in FIGS. 1A and 1B, which may avoid introducing noise into the data stream by using mechanical strategies or spacing the sensor according to signal sampling requirements, the device and system illustrated in FIG. 2 may sample both the target signal and at least one source of noise or all sources of noise. For example, the device and system can sample acoustic noise propagating through fluid in the borehole, which may be generated, for example, by a shot. As another example, in addition or in the alternative, the device and system can also be configured to sample systemic noise due to the system being in the borehole, such as vibrational or twisting wave modes propagating through a cable in a fluid-filled borehole, or through a cement plug. As another example, in addition or in the alternative, the device and system can sample noise due to the interaction between acoustic and systemic sources of noise. In each case, the spatial sampling density, or distance between sensors, is, by design, sufficient to sample adequately all desired signals whether geophysical signal, acoustic noise or systemic self-noise, or interactions between them.

Accordingly, in some embodiments, the acquisition tool can have a long enough array of closely-spaced sensors so as to simultaneously sample the desired signal and desired noise wavefields, without aliasing, and to provide enough aperture without relying on multiple shots. Such embodiments may have the benefit of ensuring a higher level of signal coherency and a better level of shot-generated noise attenuation than conventional devices. In addition, a long enough tool (in principle) may achieve efficiency of operations in surveying up to all of the borehole with a single setting of the tool. In some embodiments, the acquisition tool can have a long enough array of closely-spaced sensors so as to simultaneously sample the desired signal and all noise wavefields, without aliasing, and to provide enough aperture to separate the signals, or to sample reflection responses for imaging or Amplitude-versus-Angle analysis, without relying on multiple shots.

In some embodiments, the acquisition tool has at least one of the following: an overall configuration (e.g. length) to achieve efficiency, by sampling as much of the well as possible in one tool setting; a sensor spacing chosen to have at least two samples per shortest wavelength of interest; and/or an aperture chosen to capture one wavelength of the longest wavelength of interest. In some embodiments, the tool has a sensor spacing providing at least two samples per shortest wavelength of interest and an aperture sufficient to capture one wavelength of the longest wavelength of interest. In further embodiments, the tool is of similar length as the length of the borehole.

In some embodiments, the entire length of cable 15 is considered a single unit 200 which can be instrumented with sensors along the entire length of the cable 15 for example up to kilometers in length. In some embodiments, the cable 15 ranges from the minimum length necessary to sample a 3 Hz tube wave to the length of the borehole. In some embodiments the cable 15 ranges in length from about 100 m, or from about 250 m to about several km.

In some embodiments, the unit 200 may collect broadband data ranging anywhere from about 1 Hz, or from about 3 Hz up to about 500 Hz, or up to about 2 kHz, or above. In some embodiments, in contrast to the conventional techniques, the spacing of the sensors 210 can adequately or fully sample all signal and noise wavefields experienced by the sensors 210, whether geophysical signal, acoustic noise or systemic self-noise, or interactions between them such as tube waves, mechanical vibration noise, and seismic body waves. In other words, rather than mechanically design a solution to avoid noise in the acquisition system, noise is intentionally sampled and removed by post-processing.

In some embodiments, the unit 200 is instrumented with the necessary variety of sensors 210 such that all necessary wavefields (geophysical and mechanical) are spatially sampled, sufficiently densely and with sufficient aperture, to allow for their separation and removal. A person of skill in the art with the assistance of this disclosure should be able to choose appropriate sensors and appropriate sensor spacing to sample the target signal and noise vibrations and thereby constructing a unit 200 with the appropriate selection and spacing of sensors 210. For example, the sensors can be spaced apart no farther than is required to sample the shortest desired wavelength noise mode. By contrast, conventional devices utilize larger spacings determined by the longer wavelengths associated with the geophysical signal. For example, in some embodiments, wherein tube wave noise is sampled, sensors such as hydrophones are provided along the length of the unit 200. The spacing of the sensors can be governed by the following principles: if the tube wave noise has velocity, v, and maximum frequency, $f_{max}$, then the minimum wavelength, $W_{min}$, is $v/f_{max}$. Sampling at two points per wavelength then gives the required maximum sensor spacing, L, to sample fully the tube wave noise so that it can be attenuated in later processing without aliasing. For example, if v=1500 m/s and $f_{max}$=500 Hz, then L=1.5 m. Thus, according to the present disclosure, sensors may be spaced much closer to each other than in conventional systems in order to sample shorter wavelength modes, which may be signal (shear wave events), or noise such as the tube waves discussed above. In some embodiments, an additional benefit of the dense sampling is to oversample some of the geophysical signals improving the corresponding signal to random noise ratios.

Large apertures (1 km and more) may be useful in many applications: separation of signals with similar apparent velocities, sampling of reflection responses for a broad range of reflection angles for imaging and inversion applications, sampling of diffractions, sampling of reflections in structurally complex situations. Such applications have provided the motivation for large arrays with 100 levels of clamped receivers spaced some 10-20 m apart. In embodiments of the cable-like system, such array apertures can be reached without compromising the spacing between sensors, and hence the possibility to record unaliased data.

In some embodiments, the aperture can separate waves arriving from different directions. For instance, low frequency signal (e.g., 3 Hz, arriving at 45 degrees) on pressure measurements may be preserved and separated from tube waves (e.g., 3 Hz, arriving at 0 degrees). This could be achieved with array apertures larger than about 1.5 km and standard signal processing methods.

In some embodiments, the acquisition tool can have a long enough array of closely-spaced sensors so as to simultaneously sample the desired signal and desired noise wavefields without aliasing, and to provide enough aperture to separate the signals without relying on multiple shots, for example according to the principles discussed above. An acquisition tool with these combined features may ensure a higher level of signal coherency, a better level of shot-generated noise attenuation than conventional devices, and may achieve efficiency of operations in surveying up to all of the borehole with a single setting of the tool (depending on length).

In some embodiments, a cable-like system or a cemented system could be deployed in horizontal or highly deviated wells, where conventional (clamped) systems could not be operated due to complexities and risks of the deployment.

In some embodiments, a slim system (e.g., about 2 cm or less in diameter) could be deployed in a shallow (e.g., about 60 m deep or less) slim borehole (e.g., about 2 cm in diameter or less) for the purpose of microseismic monitoring. The use of small MEMS devices may enable a system to operate in a slim near-surface borehole.

The disclosure also relates to an apparatus for seismic analysis, which includes a seismic acquisition tool 200 as described above. In some embodiments, the apparatus further includes a processor having machine-readable instructions for removing the noise from the signal, for example the noise associated with the borehole and/or the cable system.

A number of embodiments have been described. Nevertheless it will be understood that various modifications may be made without departing from the spirit and scope of the invention. Accordingly, other embodiments are included as part of the invention and may be encompassed by the attached claims Furthermore, the foregoing description of various embodiments does not necessarily imply exclusion. For example, "some" embodiments or "other" embodiments may include all or part of "some", "other" and "further" embodiments within the scope of this invention.

What is claimed is:

1. A borehole seismic tool, comprising:
   a cable up to several kilometers in length; and
   at least one type of sensors chosen from hydrophones, geophones, accelerometers, gradient and rotational sensors arranged along the length of the cable at a density sufficient to sample a geophysical seismic signal and to intentionally sample noise without aliasing, wherein the intentionally sampled noise is from at least one source; and
   wherein the length of the cable and the density of the sensors along the length are selected for sampling the geophysical seismic signal and the at least one source of noise, wherein the sensors have a sensor spacing chosen to have at least two samples per shortest wavelength of interest, wherein the spacing is determined by $W_{min}$ is equal to $v/f_{max}$, and wherein L is equal to $W_{min}/2$, wherein $W_{min}$ is equal to minimum wavelength, v is equal to wave noise velocity, $f_{max}$ is equal to maximum frequency, and L is equal to minimum spacing.

2. A borehole seismic tool according to claim 1, wherein the sensors are configured at a sufficient density to sample the at least one source of intentionally measured noise and with sufficient aperture to allow signal separation without reliance on shot-to-shot repeatability of source signature.

3. The borehole seismic tool according to claim 1, wherein sensor spacing is selected to correspond to sampling the shortest desired wavelength noise mode.

4. A borehole seismic acquisition system, comprising: a borehole seismic tool and a processor, the borehole seismic tool is designed to sample geophysical seismic signal and at least one source of noise, and the processor includes machine-readable instructions for separating the geophysical seismic signal from the at least one source of intentionally measured noise; and
   wherein a length of the cable and a density of the sensors placed along the length are selected for sampling the geophysical seismic signal and the at least one source of noise, wherein the sensors have a sensor spacing chosen to have at least two samples per shortest wavelength of interest, wherein the spacing is determined by $W_{min}$ is equal to $v/f_{max}$, and wherein L is equal to $W_{min}/2$, wherein $W_{min}$ is equal to minimum wavelength, v is equal to wave noise velocity, $f_{max}$ is equal to maximum frequency, and L is equal to minimum spacing.

5. A borehole seismic acquisition system according to claim 4, wherein the borehole seismic tool comprises a cable up to several kilometers in length and at least one type of sensors arranged along the entire length of the cable at a density sufficient to sample without aliasing the signal and intentionally measured noise from at least one source, and wherein the at least one type of sensors have a sensor spacing chosen to have at least two samples per shortest wavelength of interest, wherein the spacing is determined by $W_{min}$ is equal to $v/f_{max}$, and wherein L is equal to $W_{min}/2$, wherein $W_{min}$ is equal to minimum wavelength, v is equal to wave noise velocity, $f_{max}$ is equal to maximum frequency, and L is equal to minimum spacing are spaced apart no further then needed to sample intentionally sampled noise with the shortest wavelength.

6. A method for collecting and analyzing borehole seismic data, comprising:
   firing a seismic source;
   using a borehole seismic tool to sample a resulting seismic signal and to intentionally measure noise from at least one source without aliasing; and
   using a processor to separate the signal from the at least one source of intentionally measured noise;
   wherein a length of the cable and a density of the sensors placed along the length are selected for sampling the geophysical seismic signal and the at least one source of noise, wherein the sensors have a sensor spacing chosen to have at least two samples per shortest wavelength of interest, wherein the spacing is determined by $W_{min}$ is equal to $v/f_{max}$, and wherein L is equal to $W_{min}/2$, wherein $W_{min}$ is equal to minimum wavelength, v is equal to wave noise velocity, $f_{max}$ is equal to maximum frequency, and L is equal to minimum spacing.

7. A method according to claim 6, wherein the borehole seismic tool comprises a cable ranging from about 100 m up to about a few kilometers in length and at least one type of sensors configured along the length of the cable at density sufficient to sample without aliasing the signal and the at least one source of intentionally measured noise.

8. A method according to claim 7, wherein the cable ranges from about 250 m in length to about a few kilometers in length.

9. A method according to claim 7, wherein the cable is deployed in a fluid-filled bore.

10. A method according to claim 7, wherein the cable is cemented in a borehole.

11. The method for collecting and analyzing borehole seismic data according to claim 6, wherein the density of the at least one type of sensor corresponds to sampling the shortest desired wavelength noise mode.

* * * * *